3 Sheets—Sheet 3.

G. W. PROUTY.
Oscillating Printing-Machine.

No. 216,890.　　　　Patented June 24, 1879.

WITNESSES.　　　　　　　　　　INVENTOR.
E. A. Hemmenway　　　　　　　George W. Prouty
C. H. Dodd　　　　　　　　　By N. C. Lombard
　　　　　　　　　　　　　　　　　ATTORNEY.

N. PETERS, PHOTO-LITHOGRAPHER, WASHINGTON, D. C.

UNITED STATES PATENT OFFICE.

GEORGE W. PROUTY, OF BOSTON, MASSACHUSETTS.

IMPROVEMENT IN OSCILLATING PRINTING-MACHINES.

Specification forming part of Letters Patent No. 216,890, dated June 24, 1879; application filed March 6, 1879.

*To all whom it may concern:*

Be it known that I, GEORGE W. PROUTY, of Boston, in the county of Suffolk and State of Massachusetts, have invented certain new and useful Improvements in Printing-Presses, of which the following, taken in connection with the accompanying drawings, is a specification.

My invention relates to that class of printing-presses in which a vibrating platen is used in combination with a fixed or stationary type-bed; and it consists, first, in a novel construction and arrangement of the mechanism for imparting motion to the platen and inking-rollers, whereby the cost of such mechanism is materially reduced, and at the same time the operation of the press is rendered more perfect, as will be hereinafter described.

It further consists in the combination of a platen-yoke made in two parts, adapted to be moved one upon or within the other, one of said parts being pivoted to the frame of the press, and provided with one or more arms projecting beyond said pivotal connection, and the other part connected at each of its ends to one of the draw-bars, and a vibrating cam-shaped stop arranged to engage with said arm or arms, or a rod or truck connected therewith, to limit the backward movement of said platen-yoke, and adapted to gradually start said yoke and the platen secured thereto from a state of rest, in advance of the contact therewith of the constantly-moving portion of the divided yoke.

It further consists in the combination, with a vibrating platen of a printing-press, of a tubular or hollow yoke, a shaft extending through the hollow of said yoke, and mounted near each end thereof in bearings fitted to and adapted to reciprocate in guideways formed in the ends of said hollow yoke, and having formed thereon, outside of said bearings, crank-pins or eccentrics of slight throw, to receive and form bearings for the draw-bars, through which the vibratory motion is imparted to the platen, all so arranged that a partial rotation of said shaft will throw off the impression.

It further consists in a novel construction and arrangement of mechanism for operating the nippers for holding the sheet to the platen, whereby such devices are very much simplified and their cost reduced, which will be better understood by reference to the description of the drawings, to be hereinafter given.

Figure 1:
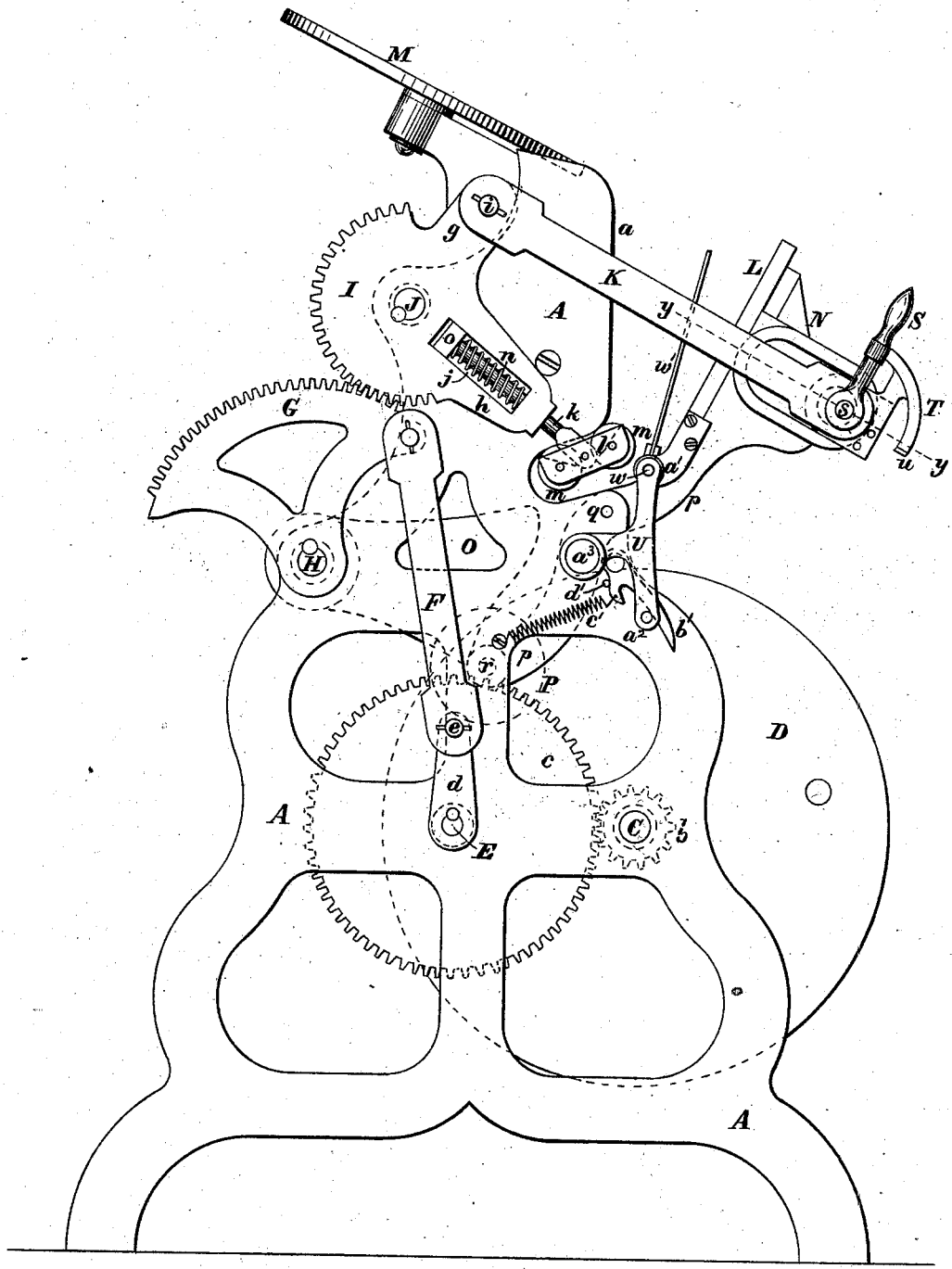
Figure 2:
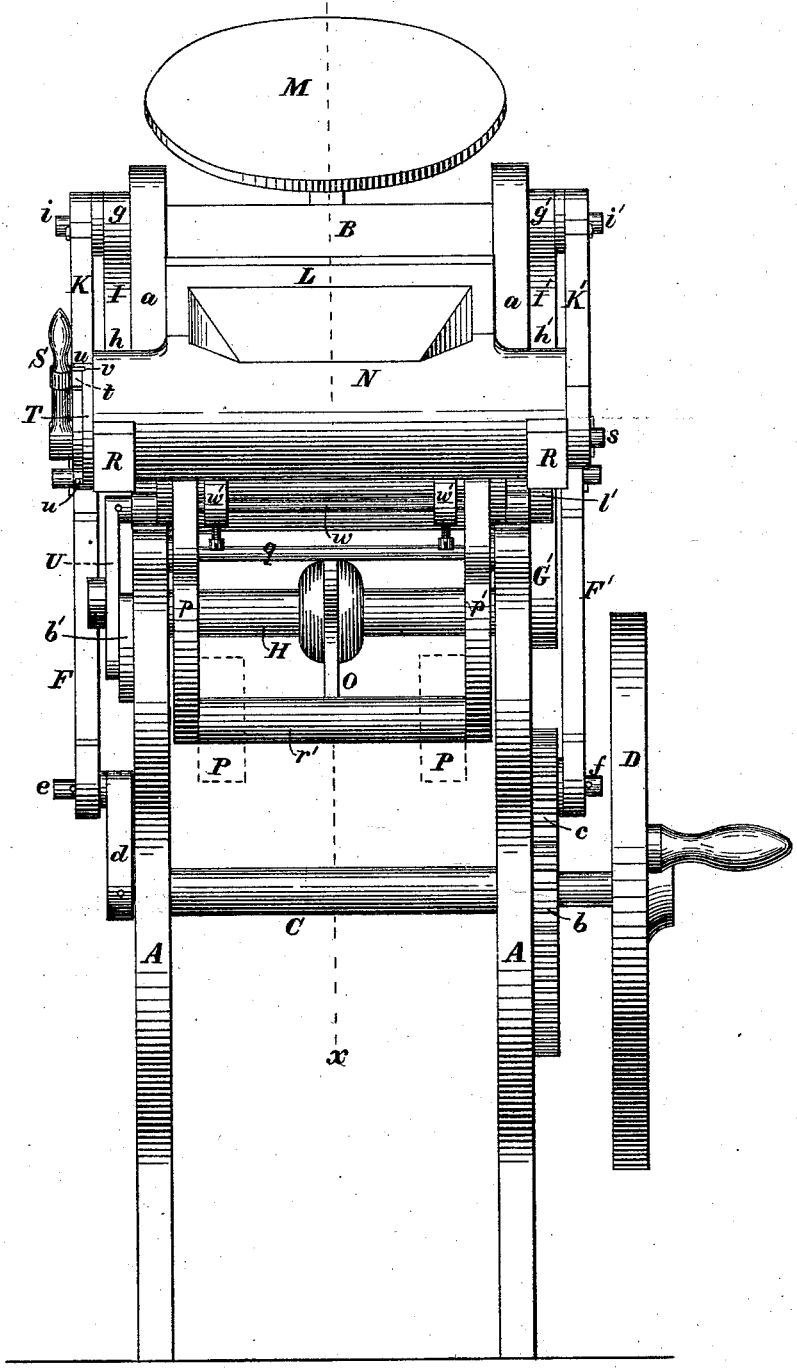
Figure 3:
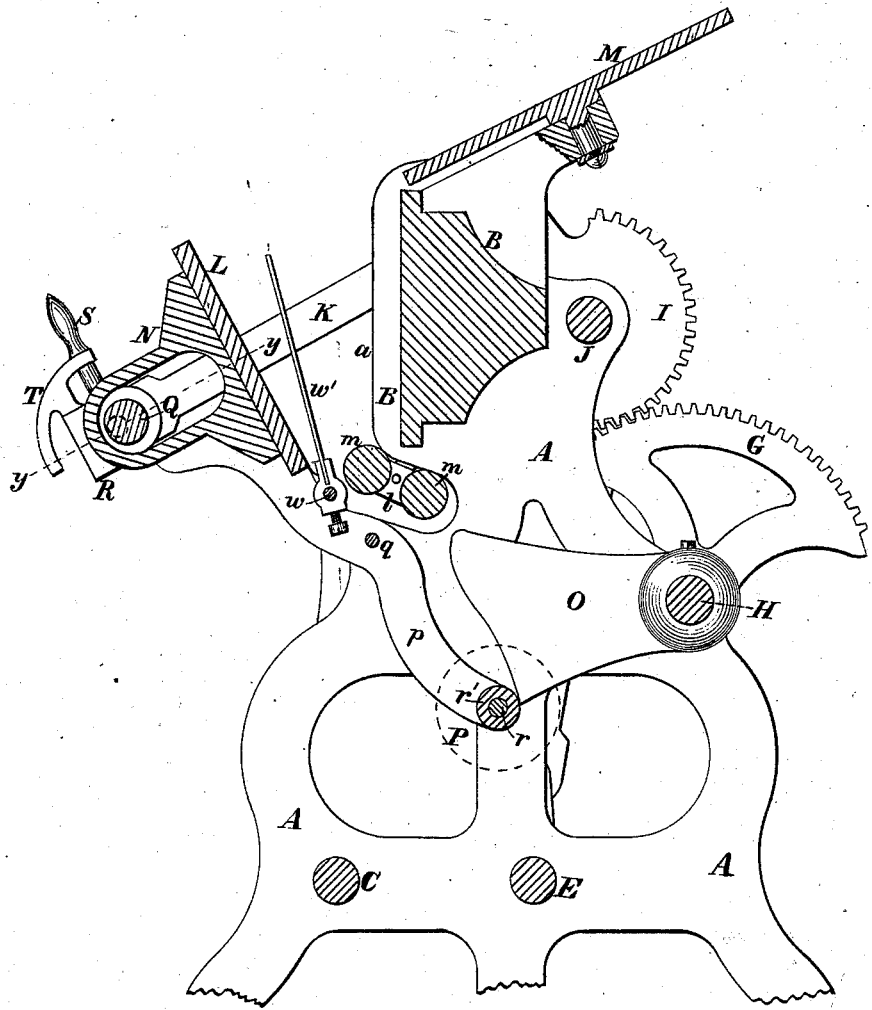
Figure 4:
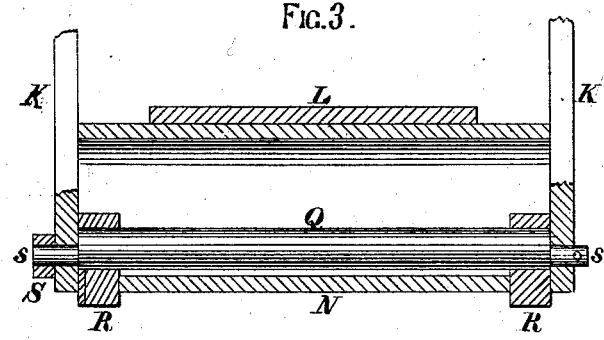

Figure 1 of the drawings is a side elevation of my improved printing-press. Fig. 2 is a front elevation of the same. Fig. 3 is a vertical section on line $x\ x$ of Fig. 2; and Fig. 4 is a horizontal section on line $y\ y$ of Figs. 1 and 3, showing the construction of the compound yoke and connecting devices.

A A are the side frames of the press, connected together by the type-bed B and suitable tie-girts, (not shown,) and having formed upon their upper portions the guideways or bearers $a\ a$, to guide the ink-rollers while passing over the form.

C is the driving-shaft, mounted in suitable bearings in the frames A A, and having secured thereon the fly-wheel or pulley D and spur-pinion $b$, which latter meshes into and imparts motion to the larger spur-gear wheel $c$, firmly secured upon one end of the crank-shaft E, also mounted in bearings in the frames A, and having secured to its other end the crank $d$, provided with the crank-pin $e$.

The wheel $c$ also has set therein the crank-pin $f$, at a distance from the center of the shaft E just equal to the distance of the crank-pin $e$ from said shaft, and in exactly the same axial line with said crank-pin $e$.

F and F' are two connecting rods or links, embracing, respectively, the crank-pins $e$ and $f$, and connected at their other ends to the toothed segments G and G', respectively secured upon opposite ends of the shaft H, and engaging with the toothed segments I and I', respectively, as shown, all so arranged and operating that a complete revolution of the crank E will cause the segments I and I' to be vibrated or moved about the axis of the shaft J, upon the opposite ends of which they are mounted, through an arc of about one hundred and thirty degrees, more or less.

The segments I and I' are each provided with two radially-projecting arms, $g$ or $g'$ and $h$ or $h'$, as shown, the arms $g$ and $g'$ having set therein the wrist-pins $i$ and $i'$, respectively, to which are connected one end of the draw-bars K or K', the opposite ends of which are connected to opposite ends of the yoke-shaft Q, as will be hereinafter described.

The arms $h$ and $h'$ of the segments I and I' have formed thereon in each a slot or opening, $j$, which forms a guideway for the inner end of the rod $k$, which has its bearing in the outer end of the arm $h$ or $h'$, and has pivoted to its outer end the saddle $l$ or $l'$, in which are formed bearings for the inking-rollers $m$ $m$, said rollers being pressed onto the type-form and the ink-distributing table M by the tension of the coiled or spiral springs $n$, surrounding the rod $k$, between the outer end of the slots $j$ and the block or collar $o$, secured to the inner end of the rod $k$, as clearly shown in Fig. 1.

The platen L is adjustably secured to the platen-yoke N, in the usual manner, by means of bolts and adjusting-screw. (Not shown.)

The platen-yoke or strengthening-bar N is made hollow, as shown, and has cast therewith two arms, $p$ $p'$, by which it is pivoted to the frames A A at $q$, said arms $p$ $p'$ extending beyond the pivotal point, and being connected together at their ends by the shaft or tie-rod $r$, upon which is mounted so as to revolve thereon the anti-friction roll or truck $r'$, which engages with and is acted upon by the cam-shaped movable end of the vibrating arm O, firmly secured upon the shaft H between the frames A A, as shown in Figs. 2 and 3.

The arms $p$ and $p'$, rod $r$, and roll $r'$ serve as a partial counter-balance to the platen and platen-yoke, and may be made of sufficient weight to counterbalance any desired portion of the weight of said parts by adding thereto disks of metal, as indicated in dotted lines at P in Figs. 1, 2, and 3, or by making those portions of the arms $p$ and $p'$ which are below and in rear of the pivotal connection to the frames, the rod $r$, and roll $r'$ all heavier.

Q is a steel shaft extending entirely through the tubular yoke or strengthening-bar N, and mounted in bearings at or near each end thereof in the blocks R, fitted to suitable guideways in the ends of the tubular yoke N, and adapted to be reciprocated therein in a direction at right angles to the working-face of the platen, said shaft being adapted to be partially rotated within said blocks, for a purpose that will presently appear.

The shaft Q has formed upon each end thereof, outside of its bearings in the blocks R, a wrist-pin, $s$, eccentric to the main body of the shaft Q, to receive the front ends of the draw-bars K and K'.

The eccentric wrist-pin $s$, at the left-hand side of the machine, also has secured thereto the handle S, provided with the projecting tooth $t$, adapted to engage with the stops $u$ $u$ at either extremity of the quadrant T, and the detent-notch $v$, formed therein for the purpose of limiting the movement of said lever in either direction when moved to rotate the shaft Q to throw off or on the impression, and to hold said shaft in a fixed position when the impression is on.

The nipper-shaft $w$ is mounted upon the platen in the usual manner, and the nippers $w'$ are adjustable thereon in a well-known manner; but the devices for operating said nippers, and which I consider as novel and of my invention, are a three-armed lever, U, secured at $a^1$ to the nipper-shaft $w$, and provided with a pin at $a^2$, adapted to engage with a stop, and weighted at $a^3$, so as to tend to throw the nippers away from the platen, and a yielding stop lever or arm, $b'$, pivoted to one of the frames A, and held by a spring, $c'$, against a stop-pin, $d'$, all as shown in Fig. 1.

The operation of my improved press is as follows: The parts being in the position shown in the drawings, and the sheet to be printed being placed upon the platen against suitable gages, (not shown,) if power is applied to the driving-shaft, so as to cause a rotation of the crank-shaft E, the crank-pins $e$ and $f$, acting upon the connecting-rods F and F', cause a partial rotation of the segments G and G', shaft H, and the segmental stop-cam O, and the segments G and G', acting upon the segments I and I', cause them to be partially rotated about their axis of motion, thereby carrying the inking-rollers $m$ $m$ upward over the type-form and partially across the ink-distributing table M, and at the same time moving the platen L into position to give the impression, at which time the draw-bars K and K' and arms $g$ and $g'$ act as toggle-joints just approaching or upon their dead-centers of motion, and at the same time the connecting-rods F and F' and crank-pins $e$ and $f$ bear the same relation to each other, thereby greatly increasing the power exerted in giving the impression.

When the segments I and I' first begin to move, the draw-bars K and K' move the shaft Q, with the boxes or blocks R, without disturbing the rest of the platen until just before the forward ends of the blocks R come in contact with the end of the slot formed in the end of the tubular yoke N, when the stop-cam O, acting upon the roll $r'$, gradually and easily starts the platen from its state of rest, when, said blocks coming in contact with the yoke N, the platen is then moved forward thereby with the full strength of the combined toggle-motion.

As the platen moves forward it comes in contact with the nippers $w'$, and carries them forward with it, partially rotating the nipper-shaft against the tension of the spring $c'$, the stop lever or arm $b'$ being moved about its pivot by the pin $a^2$ in the lower end of the lever U, straining the spring $c'$ in an obvious manner.

When the impression is completed and the crank-shaft commences the last half of its revolution, or the crank-pins $e$ and $f$ begin to move upward, the motions of the segments G, G', I, and I', inking-rollers $m$ $m$, and draw-bars K and K' are reversed, and the platen L and hollow yoke N move with the draw-bars and the shaft Q till the truck or roll $r'$ comes in contact with the concentric portion of the cam-stop O, when the motion of the platen is arrested and remains in a state of rest, while the draw-bars and the shaft Q complete their stroke and have started back upon their return stroke, thus giving ample time to feed the sheet while the platen is in a state of rest.

The tension of the spring $c'$, acting upon the stop-lever $b'$, and through it upon the lever U, causes the nippers to move with and press hard upon the platen till the stop-lever comes in contact with the pin $d'$, when the movement of the nippers substantially ceases, and the platen moves away from them, leaving them standing in the position shown in Figs. 1 and 3, in which position they are maintained by the counter-weight $a^3$ and stop-lever $b'$, so that they can be readily brought down onto the platen to determine their proper position in an obvious manner.

Motion may be imparted to the driving-shaft C by means of a belt and pulley, or it may have a crank formed in its middle and be operated by a treadle in a well-known manner.

What I claim as new, and desire to secure by Letters Patent of the United States, is—

1. As a means of operating the inking-rollers and the platen of a printing-press, the toothed segment I, provided with the two radially-projecting arms $g$ and $h$ and slot $j$, in combination with the rod $k$, set in the arm $h$, and adapted to move in the same plane with the arms $g$ and $h$ and segment I, substantially as described.

2. The combination of a platen-yoke made in two parts, both extending from side to side of the press, and adapted to be moved automatically one upon or within the other, and provided with arms $p$ $p'$, by which the platen is pivoted to the frame, and extending beyond said pivotal connection, to serve as a partial counter-balance to the platen, and a cam-shaped vibrating stop, O, adapted to engage with said arm or arms, or a rod or roll connecting them, substantially as and for the purposes described.

3. In combination with the platen of a printing-press, and a pair of draw-bars for imparting to said platen a vibrating motion toward and from the type-bed, the hollow or tubular platen-yoke N, the shaft Q, extending through said platen-yoke from side to side of the machine, and provided with eccentric wrist-pins $s$ $s$, and the boxes or blocks R R, forming bearings for the shaft Q, and fitted and adapted to be reciprocated in suitable guideways in the ends of the hollow yoke N, substantially as and for the purpose described.

4. The combination, with the vibrating platen of a printing-press, of the nipper-shaft $w$, weighted lever U, stop-lever $b'$, spring $c'$, and a fixed stop, $d'$, all arranged and adapted to operate substantially as described.

Executed at Boston, Massachusetts, this 1st day of March, A. D. 1879.

GEORGE W. PROUTY.

Witnesses:
N. C. LOMBARD,
E. A. HEMMENWAY.